United States Patent [19]

Houdayer et al.

[11] Patent Number: 4,472,454
[45] Date of Patent: Sep. 18, 1984

[54] PROCESS FOR THE DENSIFICATION OF A POROUS STRUCTURE

[75] Inventors: Michel Houdayer, Paris; Jean Spitz, Gieres; Danh Tran-Van, Brignoud, all of France

[73] Assignee: Commissariat a l'Energie Atomique, Paris, France

[21] Appl. No.: 444,173

[22] Filed: Nov. 24, 1982

[30] Foreign Application Priority Data

Nov. 26, 1981 [FR] France .............................. 81 22163

[51] Int. Cl.³ ............................................ B05D 3/02
[52] U.S. Cl. .................................. 427/45.1; 427/228; 427/249; 427/430.1
[58] Field of Search ...................... 427/45.1, 228, 249, 427/430.1, DIG. 11

[56] References Cited

U.S. PATENT DOCUMENTS

| B 513,027 | 2/1976 | Heivert | 427/249 |
| 1,804,361 | 5/1931 | Marcin | 427/45.1 |
| 3,102,047 | 8/1963 | Rivington | 427/228 |
| 3,167,447 | 1/1965 | Tully et al. | 427/228 |
| 3,549,847 | 12/1970 | Clark et al. | 427/228 |
| 3,682,686 | 8/1972 | Nakamura et al. | 427/228 |
| 4,226,900 | 10/1980 | Carlson et al. | 427/228 |
| 4,396,669 | 8/1983 | Cariou | 427/228 |

FOREIGN PATENT DOCUMENTS

| 1099510 | 2/1961 | Fed. Rep. of Germany | 427/228 |
| 1215384 | 12/1961 | France | 427/228 |
| 56-17915 | 7/1979 | Japan | 427/228 |
| 34111 | 1/1956 | Luxembourg . | |
| 410882 | 10/1966 | Switzerland . | |

Primary Examiner—Sadie L. Childs
Attorney, Agent, or Firm—Pearne, Gordon, Sessions, McCoy, Granger & Tilberry

[57] ABSTRACT

A process is disclosed for the densification of a porous structure. The structure is immersed in a liquid hydrocarbon and is heated by induction so as to form, by decomposition of the hydrocarbon, carbon or pyrolytic graphite which can be deposited in the pores or cavities of the structure. The process may be used for the densification of fabrics or felts for use in pads in disc brakes.

9 Claims, 2 Drawing Figures

4,472,454

PROCESS FOR THE DENSIFICATION OF A POROUS STRUCTURE

BACKGROUND OF THE INVENTION

The present invention relates to a process for the densification of a porous structure consisting of filling the voids, gaps or cavities of a porous structure by introducing thereinto an identical or different material from that forming the structure. The filling of the cavities of the structure lead to an increase in the density thereof, which justifies the use of the word "densification".

The invention more particularly applies to the densification of fabrics or felts of a bidirectional or tridirectional nature, which can advantageously be used as a result of their high mechanical strength, their excellent thermal insulation capacity and their good resistance to impacts and abrasions for the production of brake disks.

Hitherto, the densification methods which have been used have consisted of immersing the structure to be densified in a liquid bath of pitch or pyrolyzable resins and then pyrolyzing the pitch or resin so as to rigidify the assembly, or placing the structure to be densified in a gas stream, such as a stream of gaseous hydrocarbons and then raising it to a high temperature, e.g. in such a way as to crack the gaseous hydrocarbons in order to obtain carbon or pyrolytic graphite, which can be deposited in the cavities of the structure. Unfortunately, the time necessary for performing these processes is generally too long, when it is desired to obtain a high density structure.

BRIEF SUMMARY OF THE INVENTION

The invention relates to a novel process for the densification of a porous structure making it possible to obtain a high density structure in a much shorter time than that necessary for the densification carried out according to the prior art processes.

More specifically, the present invention relates to a process for the densification of a porous structure, wherein the structure is immersed in a liquid hydrocarbon and is heated by induction so as to form, by decomposition of the hydrocarbon, carbon or pyrolytic graphite which can be deposited in the pores or cavities of the structure.

This process applies in a non-exclusive manner to the densification of a carbon or graphite porous structure.

According to a preferred embodiment of the process according to the invention, the porous structure immersed in the liquid hydrocarbon is heated to a temperature between 1000° and 1300° C.

According to another preferred embodiment of the process according to the invention, the liquid hydrocarbon is cyclohexane.

BRIEF DESCRIPTION OF THE DRAWINGS

The invention is described in greater detail hereinafter relative to non-limitative embodiments and the attached drawings, wherein.

DETAILED DESCRIPTION OF THE PREFERRED EMBODIMENTS

According to the invention, the process consists of immersing a porous structure made e.g. from carbon or graphite in a liquid hydrocarbon, such as for example cyclohexane, and heating it by induction and preferably to a temperature between 1000° and 1300° C. in order to form, by decomposition of the hydrocarbon, pyrolytic graphite or carbon, which is deposited in the cavities or pores of the structure.

Figure 1:
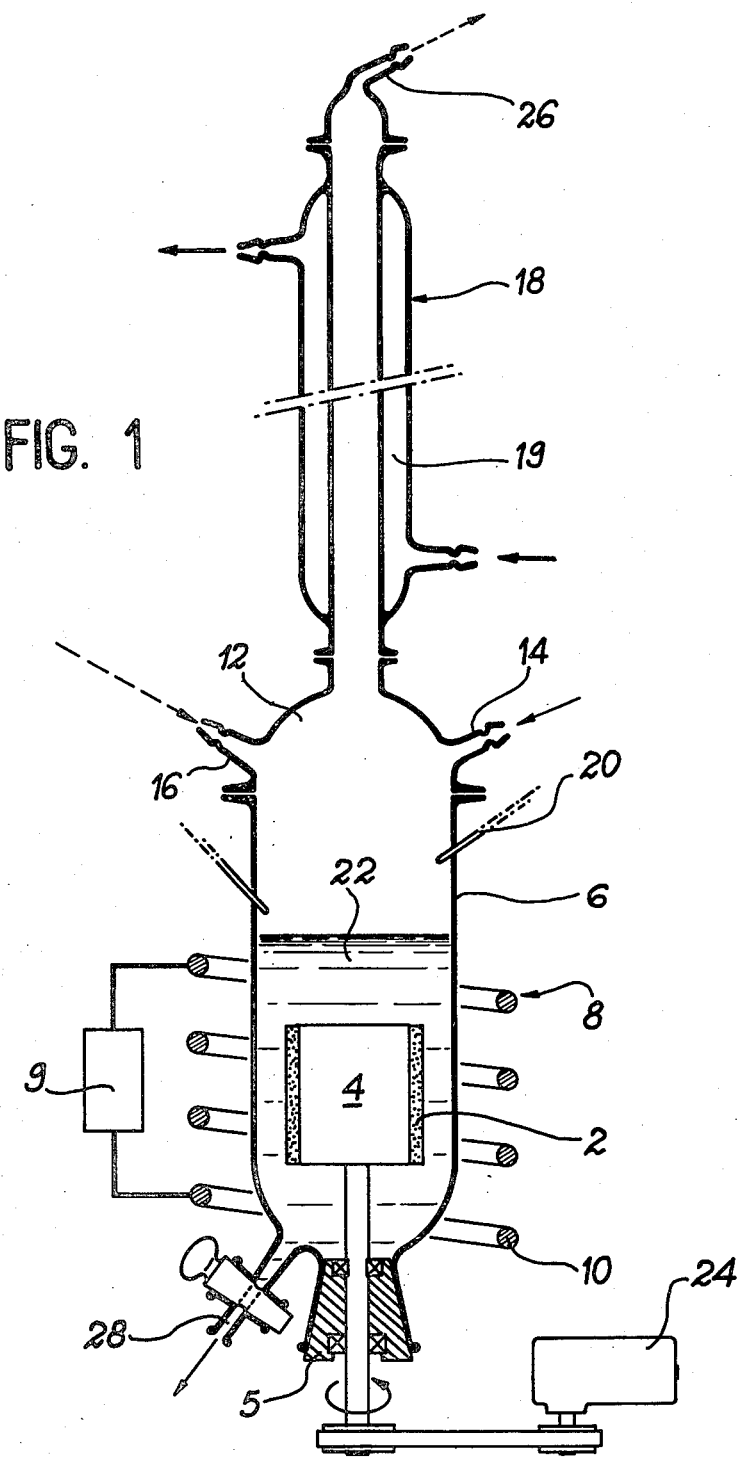
FIG. 1 shows, diagrammatically, a device for performing the process according to the invention.

FIG. 1 shows a device for performing the process according to the invention. The porous structure 2 to be densified is placed on a rotary mandrel or support 4. This support or mandrel, made for example from graphite is placed in the lower part of the body of the reactor 6, which has a plug 5 provided with an opening through which can slide support 4. Reactor 6 can be heated by means of an induction heating device 8 constituted by coils 10 in which can circulate a high frequency current supplied by a generator 9. The upper part of reactor 6 is sealed by a cover 12, provided with a pipe 14 used for introducing liquid hydrocarbon into the reactor and a pipe 16 used for introducing a neutral gas into the reactor and which is used for expelling the air contained in said reactor.

Furthermore, cover 12 is surmounted by a condenser 18 permitting the separation of the unconsumed hydrocarbon, which is recovered and the neutral gas which is eliminated. The condensation of the different vapours is ensured by a circulation of water in the condenser jacket 19.

This device is also provided with a system making it possible to determine the temperature prevailing in reactor 6, said system being constituted e.g. by thermometer probes 20 located in the reactor body.

A description will now be given of a handling sequence with the device as described hereinbefore. This handling or manipulation firstly consists of placing the structure to be densified 2 on its rotary support 4 and then sealing the upper part of reactor 6 by means of cover 12 surmounted by condenser 18, the reactor then being equipped with its heating system 8. When this has been done, it is possible to fill reactor 6 with liquid hydrocarbon 22 until the porous structure to be densified is completely immersed. The complete installation is then scanned by a stream of inert gas making it possible to expel the air present in the installation. After opening the cooling circuit 18, support 4 can be rotated by means of a motor 24 located outside the reactor. The reactor can then be heated by heating system 8 and is then kept at a particular temperature level for a few minutes. The temperature level is measured by means of probes 20.

The heated liquid hydrocarbon vaporizes and then decomposes into carbon or pyrolytic graphite and hydrogen. The carbon or pyrolytic graphite can then be deposited within the structure to be densified, whereas the hydrogen and the undecomposed hydrocarbon are discharged from the upper part of the reactor. The hydrocarbon vapours are condensed in the condenser 18 provided for this purpose and the hydrogen is expelled to the outside by pipe 26. At the end of about 10 minutes, it is possible to discontinue heating and then allow cooling to take place to ambient temperature. After emptying the reactor by means of a cock 28 located in the lower part of the reactor, followed by the opening of the latter, the densified member can be removed.

By analogy with boiling phenomena of different liquids in which the hot body is immersed, it would appear that different stages for this experiment can be defined. Initially, the liquid hydrocarbon is heated by natural convection and evaporation thereof only takes place on the surface of the liquid. Boiling of the liquid then continues and gas bubbles form level with the porous structure and rise through the liquid mass producing natural circulation streams. At this time, the immersed porous structure is separated from the liquid by a vapour film. It is then that the gas diffuses through the porous structure and carbon or pyrolytic graphite forms.

In view of the fact that the carbon or graphite is initially deposited in contact with the mandrel, a densification gradient is obtained from the interior to the exterior of the structure. As in the prior art processes using deposition in the gaseous phase, the deposition rate of the graphite and the pyrolytic carbon is proportional to the hydrocarbon concentration.

Figure 2:
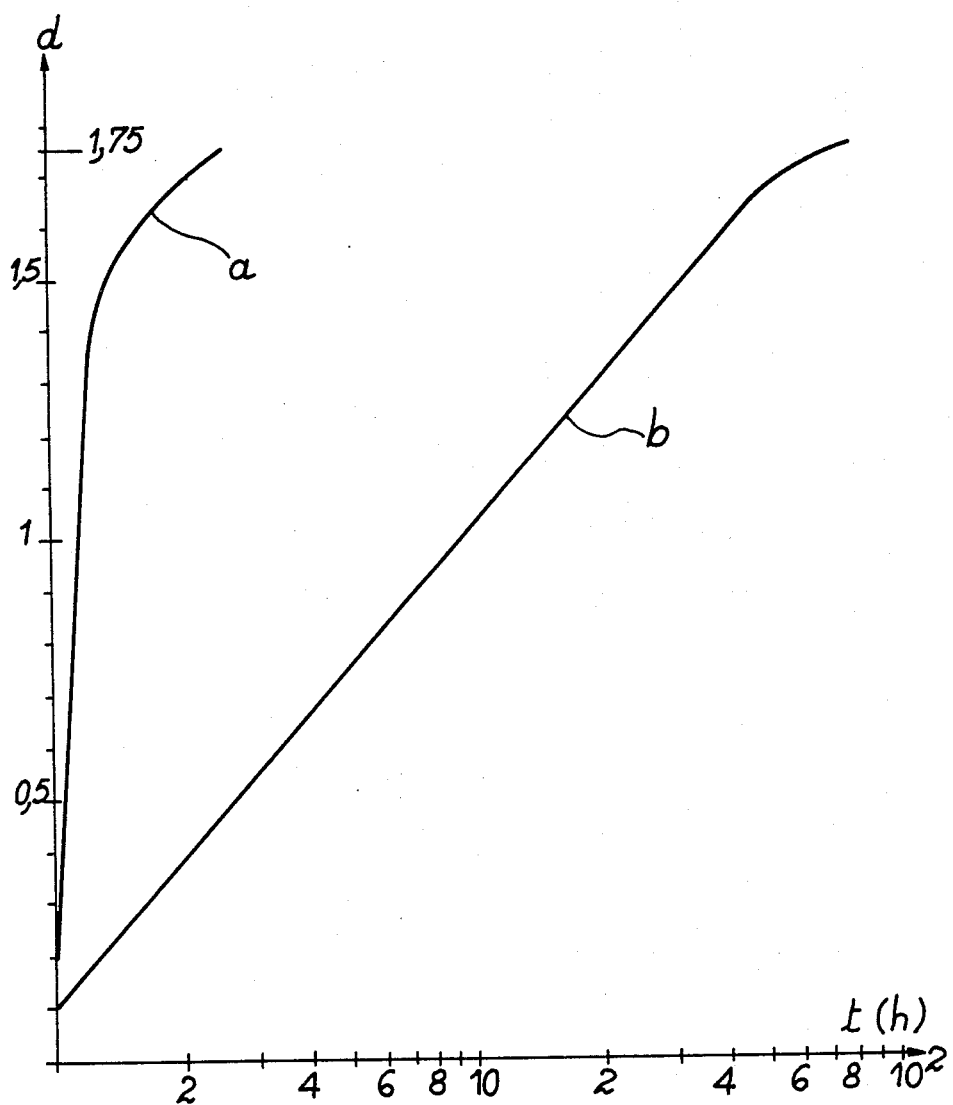
FIG. 2 depicts curves giving the density d of a densified structure as a function of the time t expressed in hours h; curve a corresponding to a densification according to the invention and curve b to a densification by deposition in the gaseous phase.

FIG. 2 shows curves giving the density d of a densified structure as a function of time t. Curve a corresponds to densification according to the invention and curve b to densification by deposition in the gaseous phase.

Curve a has been plotted on the basis of a carbon fabric of initial density 0.1 and curve b on the basis of a carbon felt of initial density 0.1.

Comparison of these two densification curves show that the average impregnation speed of the porous structure by cyclohexane is approximately 100 times greater than that obtained by deposition in the gaseous phase. However, it should be noted that fabrics are always more difficult to impregnate than felts.

Moreover, studies have shown that porous structures densified according to the process of the invention have a texture and also physical characteristics identical to those obtained in porous structures densified according to the prior art processes.

What is claimed is:

1. A process for the densification of a porous structure having pores or cavities into which carbon or pyrolytic graphite may be introduced to increase the density of the structure comprising the steps of immersing the porous structure in a liquid hydrocarbon, heating the immersed structure and liquid hydrocarbon with induction heating, and, while the structure is immersed in the liquid hydrocarbon, vaporizing liquid hydrocarbon so that the immersed structure is substantially surrounded by a vapor film of vaporized liquid hydrocarbon and directly decomposing vaporized liquid hydrocarbon in a single continuous step so as to form, by decomposition of the hydrocarbon, carbon or pyrolytic graphite which is deposited in the pores or cavities of the structure.

2. A densification process according to claim 1, wherein the porous structure is of carbon or graphite.

3. A densification process according to claims 1 or 2, wherein heating takes place to temperatures between 1000° to 1300° C.

4. A densification process according to claims 1 or 2, wherein the liquid hydrocarbon is cyclohexane.

5. A densification process according to claim 1 or 2 wherein said pore structure is a fabric or a felt.

6. A densification process according to claim 1, wherein said liquid hydrocarbon is present only as liquid and vapor phases prior to decomposition thereof.

7. A process for the densification of a porous structure having pores or cavities in which carbon or pyrolytic graphite may be deposited to increase the density of the structure comprising the steps of immersing the porous structure in a liquid hydrocarbon which is to be decomposed to provide the carbon or pyrolytic graphite for densification of the porous structure, heating the immersed structure and liquid hydrocarbon with induction heating to vaporize liquid hydrocarbon and directly decompose vaporized liquid hydrocarbon to form carbon or pyrolytic graphite which is deposited in the pores and cavities of the porous structure in a single continuous step while the structure is immersed in the liquid hydrocarbon.

8. A densification process according to claim 7 wherein said porous structure is a fabric or a felt of carbon or graphite.

9. A densification process according to claim 7, wherein said liquid hydrocarbon is present only as liquid and vapor phases prior to decomposition thereof.

* * * * *